United States Patent [19]

Kelderman

[11] Patent Number: 5,842,757
[45] Date of Patent: Dec. 1, 1998

[54] TRACK SYSTEM FOR VEHICLES

[75] Inventor: Gary L. Kelderman, Oskaloosa, Iowa

[73] Assignee: AgTracks, Inc., Mt. Vernon, Ind.

[21] Appl. No.: 764,869

[22] Filed: Jan. 31, 1997

[51] Int. Cl.$^6$ .................................................. B62D 55/14
[52] U.S. Cl. ........................ 305/125; 305/132; 305/135; 305/195
[58] Field of Search ..................... 305/124, 125, 305/129, 130, 134, 135, 138, 142, 143, 150, 151, 152, 153, 154, 155, 169, 195, 199, 132; 180/9.1, 9.21, 9.26, 9.5, 9.52, 9.54, 9.56

[56] References Cited

U.S. PATENT DOCUMENTS

| | | |
|---|---|---|
| 1,038,569 | 9/1912 | Grover . |
| 2,105,917 | 1/1938 | Herrington . |
| 2,157,711 | 5/1939 | Lamb ...................................... 180/9.56 |
| 2,453,750 | 11/1948 | Kamlookhine ........................... 305/154 |
| 2,467,947 | 4/1949 | Skelton . |
| 2,496,136 | 1/1950 | Smith . |
| 2,504,128 | 4/1950 | Jacobson et al. .................... 305/125 X |
| 2,676,450 | 4/1954 | Schaaf et al. . |
| 2,719,062 | 9/1955 | Arps . |
| 3,082,044 | 3/1963 | Klemm et al. . |
| 3,163,249 | 12/1964 | Ledohowski . |
| 3,173,236 | 3/1965 | Byrd . |
| 3,304,703 | 2/1967 | Schaaf . |
| 3,412,820 | 11/1968 | Wachholz . |
| 3,447,620 | 6/1969 | Schoonover . |
| 3,458,214 | 7/1969 | West . |
| 3,584,444 | 6/1971 | Sammann et al. . |
| 3,688,858 | 9/1972 | Jesperson ............................ 305/125 X |
| 3,689,123 | 9/1972 | Barbieri . |
| 3,720,277 | 3/1973 | Masaoka .............................. 305/128 X |
| 3,774,708 | 11/1973 | Purcell et al. . |
| 3,826,388 | 7/1974 | Oldenburg et al. . |
| 3,841,424 | 10/1974 | Purcell et al. . |
| 3,885,641 | 5/1975 | Harris . |
| 3,938,606 | 2/1976 | Yancey . |
| 4,227,749 | 10/1980 | Hesse . |
| 4,313,516 | 2/1982 | Terry . |
| 4,406,501 | 9/1983 | Christensen . |
| 4,429,516 | 2/1984 | Erickson . |
| 4,458,954 | 7/1984 | Haas . |
| 4,708,218 | 11/1987 | Makela . |
| 4,722,174 | 2/1988 | Landry et al. . |
| 4,817,746 | 4/1989 | Purcell et al. . |
| 4,865,141 | 9/1989 | Gey . |
| 4,936,639 | 6/1990 | Pohjola . |
| 4,944,562 | 7/1990 | Garrison . |
| 4,953,919 | 9/1990 | Langford . |
| 5,273,126 | 12/1993 | Reed et al. . |
| 5,316,381 | 5/1994 | Isaacson et al. . |
| 5,343,960 | 9/1994 | Gilbert . |
| 5,368,115 | 11/1994 | Crabb . |
| 5,452,949 | 9/1995 | Kelderman . |

FOREIGN PATENT DOCUMENTS

| | | | |
|---|---|---|---|
| 0017187 | 1/1988 | Japan . | |
| 0189170 | 4/1958 | Sweden . | |
| 1263573 | 10/1986 | U.S.S.R. . | |
| 1324916 | 7/1987 | U.S.S.R. ................................ | 305/143 |
| 1523457 | 11/1989 | U.S.S.R. ................................ | 305/143 |

OTHER PUBLICATIONS

Farm Show, Nov.–Dec. 1994, vol. 18, No. 6, p. 27.

*Primary Examiner*—Russell D. Stormer
*Attorney, Agent, or Firm*—Jansson, Shupe, Bridge & Munger, Ltd.

[57] ABSTRACT

A four pivot point track suspension apparatus for a vehicle. The track suspension apparatus includes a frame, a drive wheel, an undercarriage, and a continuous flexible track. The continuous flexible track is engaged by and driven by the drive wheel which is rotatably attached to the vehicle and operably attached to the frame. The undercarriage includes a leading equalizer pivotally mounted to the frame and having leading and trailing idler rollers rotatably attached thereto and a trailing equalizer pivotally mounted to the frame having an intermediate idler roller assembly and trailing idler rollers rotatably attached thereto. The leading equalizer is spring biased against the frame to maintain constant tension on the track and to ensure that all the idler rollers are in constant engagement with the track.

5 Claims, 8 Drawing Sheets

TRACK SYSTEM FOR VEHICLES

TECHNICAL FIELD

The present invention relates generally to a track suspension apparatus for vehicles and, more particularly, to an apparatus which permits the undercarriage to be pivotally mounted to the frame so as to maintain substantially uniform tension on the flexible track and to allow more surface area of the flexible track to remain in contact with the soil at all times to improve traction of the vehicle. Additionally the track suspension apparatus is interchangeable among various types of vehicles having either axles with hubs or axles without hubs.

BACKGROUND ART

Various track suspension devices have been devised for vehicles such as agricultural tractors, combines, etc. These suspension systems have previously had a rigid undercarriage system preventing the idler rollers to pivot and recoil as the vehicle passes over rough and uneven terrain. The inability of the rollers to pivot and recoil often places the flexible track under extreme tensile stress which may result in tearing of the track. Alternatively, the track may develop excess slack as it passes over the rough and uneven terrain causing the track driving mechanism to slip.

Additionally, these track suspension devices typically are manufactured differently depending upon whether they are to be attached to an axle having a groove therein such as that typically found on an agricultural tractor and a different device or attaching mechanism is provided for track suspension systems which are to be attached to agricultural combines, field choppers, cotton pickers or similar devices which have a hub rigidly attached to each end of the drive axles. Larger four wheel drive tractors often also use a hub with holes instead of a grooved axle.

Accordingly, there is a need for a track suspension apparatus in which the undercarriage is free to pivot and recoil as the track passes over rough or uneven terrain to maintain substantially uniform tension on the flexible track and to allow more surface area of the flexible track to remain in contact with the soil at all times to improve traction of the vehicle. And in addition, there is a need for a track suspension apparatus which can easily and quickly be attached to either a vehicle with various configurations of hubless axles or a vehicle having a hub attached thereto.

DISCLOSURE OF THE INVENTION

The present invention relates generally to track suspension apparatus for a vehicle having a frame, a drive wheel, a four pivot point undercarriage system and a flexible track. The continuous flexible track is engaged by and driven by the drive wheel, which is rotatably attached to the vehicle and operably attached to the frame. The undercarriage includes a leading equalizer pivotably mounted to the frame and having idler rollers rotatably attached thereto and a trailing equalizer pivotably mounted to the frame having idler rollers rotatably attached thereto. Pivotally attached to the trailing equalizer is an intermediate idler roller assembly. The leading equalizer is spring biased against the frame to maintain substantially uniform tension on the track. Additionally, an adaptive device associated with the mounting structure is provided for permitting the track suspension apparatus to be attached directly to a grooved axle of a first vehicle at times and, alternatively, to a hub rigidly affixed to an axle of a second vehicle at other times rotatably attached operably attached to the frame for engaging and driving the flexible track.

An object of the present invention is to provide an improved track suspension apparatus.

A further object of the invention is to provide a track suspension apparatus adaptable to a single drive axle which allows the track suspension apparatus to flex on the bottom thereof as it passes over obstructions rather than the bottom staying substantially flat but requiring that it pivot about the drive axis as it moves over obstructions.

Another object of the present invention is to provide such track suspension apparatus of a type which has an adaptive device for permitting the track suspension apparatus to easily and quickly be changed among a vehicle having a hubless axle and a vehicle having an axle with a first hub configuration thereon, and a vehicle having a different hub configuration.

Other objects, advantages, and novel features of the present invention will become apparent from the detailed description of the invention when considered in conjunction with the accompanying drawings.

BEST MODE FOR CARRYING OUT THE INVENTION

Figure 1:
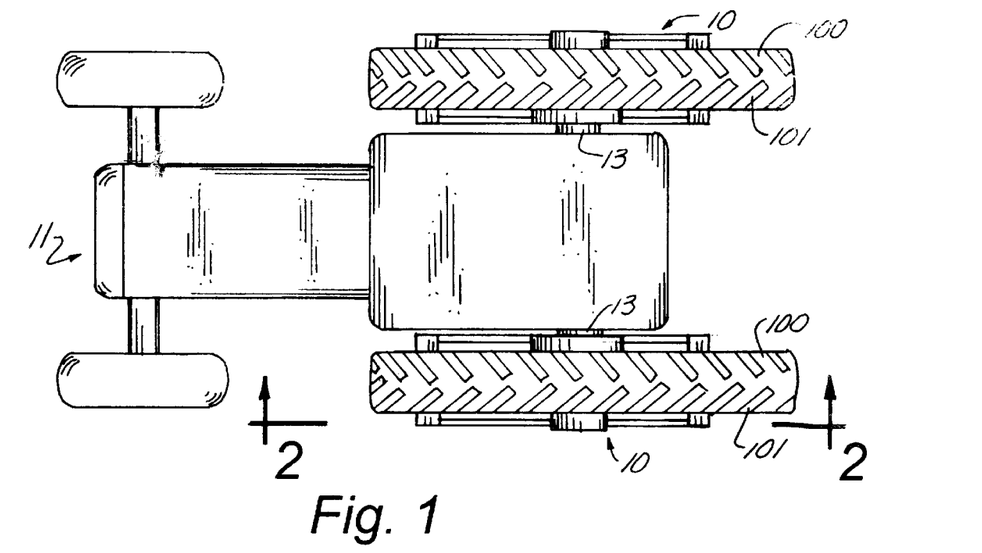
FIG. 1 is a top plan view of an agricultural tractor having a track suspension apparatus of the present invention attached to the rear driving axle thereof.
Figures 8, 9:
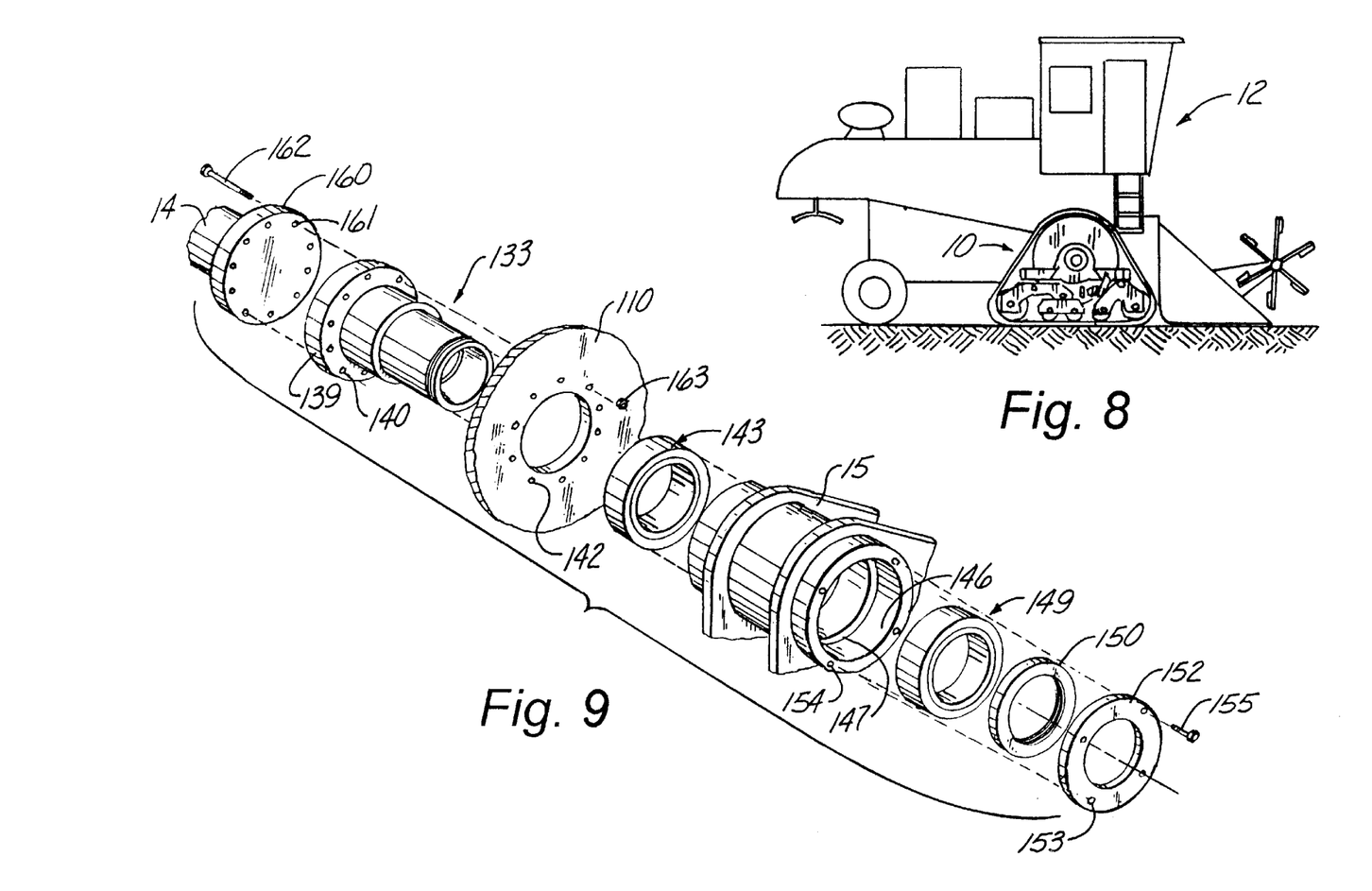
FIG. 8 is a side elevational view of a track suspension apparatus attached to an agricultural combine.
FIG. 9 is an exploded view of the primary frame, the drive wheel and the associated parts used to attach the track suspension device to the hub of an agricultural combine.

Referring now to the drawings wherein like reference numerals designate identical or corresponding parts throughout the several views, FIG. 1, is a generalized overhead plan view of a vehicle (11) employing a flexible track system which incorporate the track suspension apparatus (10) of the present invention. Such flexible track systems are, apart from their inclusion of the inventive features disclosed and claimed herein, are used for the same purposes as the flexible track systems to that shown in U.S. patent application Ser. No. 08/229,926 to Kelderman, now U.S. Pat. No. 5,452,949; U.S. patent application Ser. No. 08/493,944 (now abandoned) and its U.S. continuation-in-part patent application Ser. No. 08/740,823, now U.S. Patent No. 131313, all three of which are incorporated by reference herein. The track suspension apparatus of the is shown in its intended mode of operation, in this case with one such apparatus attached to each side of the rear axle (13) of the vehicle (11) which can be an agricultural tractor. Further, FIG. 8 provides a side view of the track suspension apparatus (10) attached in the preferred way to a vehicle (12) of a generalized agricultural type which can be a combine. As will be made clear later in this description, the track suspension apparatus (10) of the present invention (10) is driven by a powered axle from a vehicle (11, 12), and thus could be attached, for example, to a front axle (14), a rear axle (13), or both, provided that these axles are powered.

Figure 2:
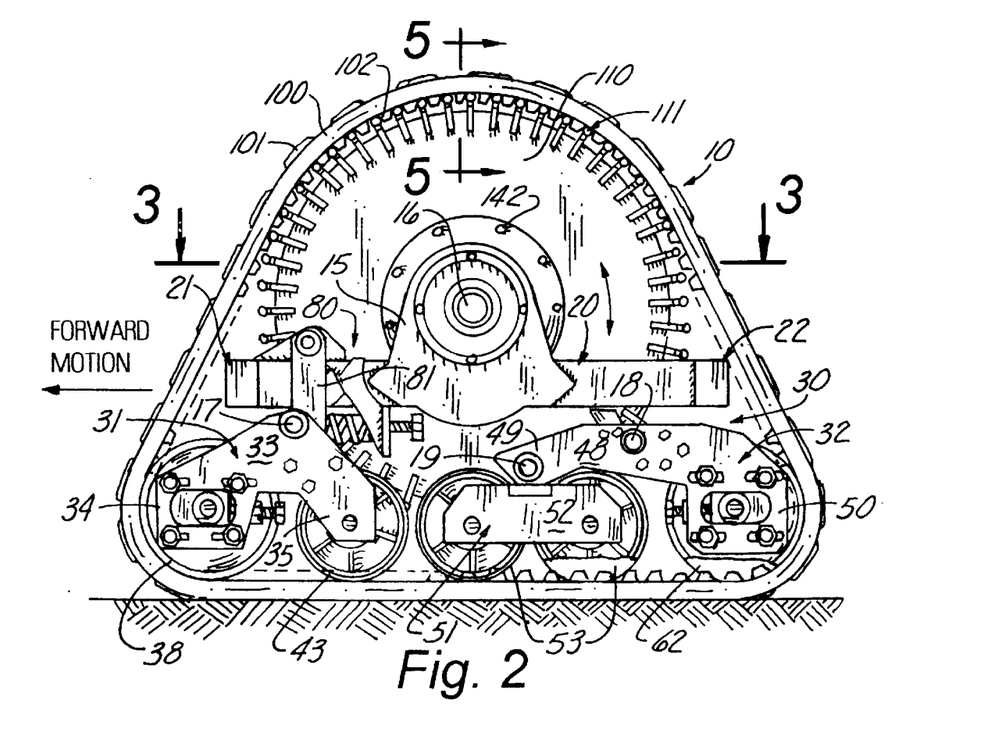
FIG. 2 is a side elevational view of one of the track suspension devices as viewed along line 2—2 of FIG. 1.
Figure 3:
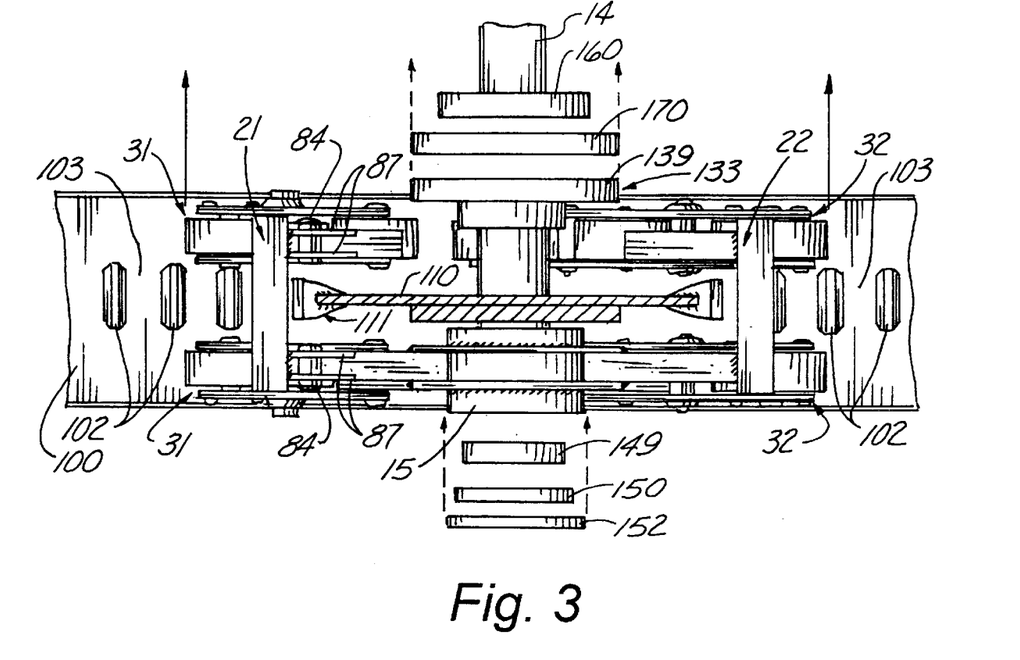
FIG. 3 is a cross-sectional view taken along line 3—3 of FIG. 2.

A side elevational view of the device (10) as shown in FIG. 2 was taken along line 2—2 in FIG. 1. The intended direction of motion is indicated by a solid arrow to the left of the track suspension apparatus (10). Thus references hereinafter to general relative directions such as "forward" or "lead" shall be understood to be toward the direction of motion whereas terms such as "rear" or "trailing" shall be understood to be away from the direction of motion. It is to be understood that the apparatus is capable of motion in either a forward or reverse direction so long as the axle (13, 14) can be rotated by the vehicle (11, 12) in either way, as is the case with most conventional vehicles of the type with which this invention is concerned.

Figure 13:
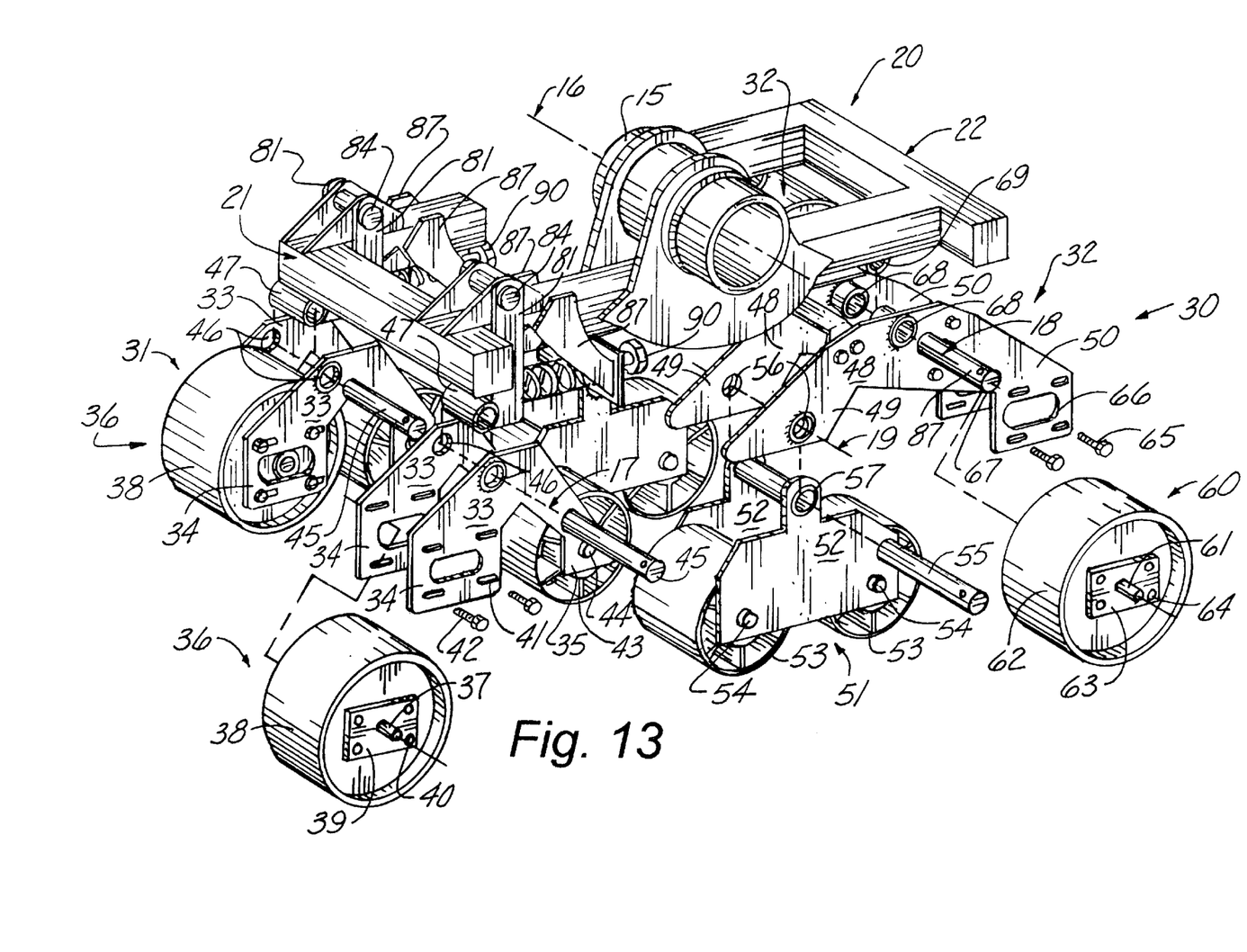
FIG. 13 is a perspective view of the track suspension apparatus.

The rubber track system (10) includes a frame (20) which is attached to an axle (13, 14) extending from the vehicle (11, 12). Details and options for the manner of this attachment will be given below. As best illustrated in FIGS. 2 and 13, the frame (20) generally comprises a forward portion (21) and a rear portion (22) which are provided for purposes of attachment and support of the undercarriage (30) and other elements of the apparatus (10). Intermediate the forward portion (21) and rear portion (22) of the frame (20) is rigidly attached a spindle hub (15) the function of which will be discussed later. The apparatus (10) includes four main pivot axes (16, 17, 18 and 19), (see FIG. 2) the purpose of which will also be discussed later.

The undercarriage (30) includes two sets of leading equalizers (31) pivotably attached to the forward portion (21) of the frame (20) at the second pivot axis (17) and two sets of trailing equalizers (32) pivotably attached to the rear portion (22) of the frame (20) at the third pivot axis (18). Each leading equalizer (31) is comprised of two plates (33) each having a leading arm (34) and a trailing arm (35). Positioned between the leading arms (34) of each leading equalizer (31) is an idler roller assembly (36) having a shaft (37) extending through an idler roller (38) and projecting through a plate (39) on each side of the idler roller (38). Near the four corners of each plate (39) are four holes (40). Each idler roller assembly (36) is bolted to each leading arm (34) through slots (41) and holes (40) of each plate (39). The shaft (37) of each idler roller assembly (36) fits into a slot (42) in each leading arm (34). The slots (41 and 42) in the leading arms (34) allow the idler roller assembly (36) to be slidably positioned to achieve contact with the inside of the track (100). A trailing idler roller (43) is positioned between each trailing arm (35) and is rotatably attached to each trailing arm (35) by a first pin (44). The leading equalizer (31) is pivotably mounted to an arm (81) at the forward portion (21) of the frame (20) by a second pin (45) which fits into holes (46) located in each plate (33) of the leading equalizer (31) and through a bushing (47) rigidly attached to said arm (81).

Each trailing equalizer (32) is comprised of two plates (48) each having a leading arm (49) and a trailing arm (50). Positioned between the leading arms (49) of each trailing equalizer (32) is an intermediate idler roller assembly (51). The intermediate idler roller assembly (51) is comprised of two plates (52). Positioned between each plate (52) are two idler rollers (53) each having a shaft (54) extending through the idler rollers (53) and projecting through plates (52). The intermediate idler roller assembly (51) is pivotably mounted to the leading arm (49) by a third pin (55) extending through holes (56) in each leading arm (49) of each plate (48) of the trailing equalizer (32) and through a mounting attachment (57) projecting from the intermediate idler assembly (51).

Similar to the leading equalizer (31), positioned between the trailing arms (50) of each trailing equalizer (32) is a trailing idler roller assembly (60) having a shaft (61) extending through an idler roller (62) and projecting through a plate (63) on each side of the roller (62). Near the four corners of each plate (63) are four holes (64). Each idler roller assembly (60) is bolted to each trailing arm (50) of the trailing equalizer (32) through slots (65) in the trailing arm (50) and the holes (64) in each plate (63). The shaft (61) of each idler roller assembly (60) fits into a slot (66) in each trailing arm (50). The slots (65 and 66) in the trailing arms (50) allow the idler roller assembly (60) to be slidably positioned to achieve contact with the inside of the track (100). The trailing equalizer (32) is pivotably mounted to the rear portion (22) of the frame (20) by a fourth pin (67) which fits into holes (68) located in each plate (48) and through a bushing (69) welded to the frame (20).

Figure 7:
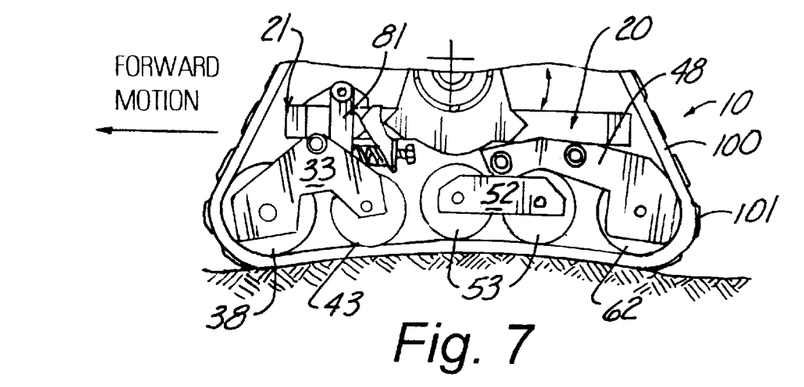
FIG. 7, 7A and 7B are side elevation views illustrating the pivoting characteristics of the equalizers of the track suspension apparatus as it is operated over uneven terrain.
Figure 7A:
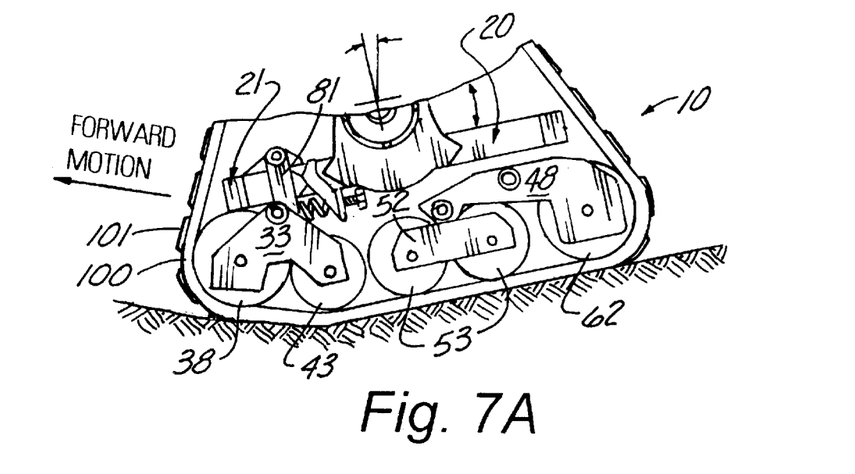
Figure 7B:
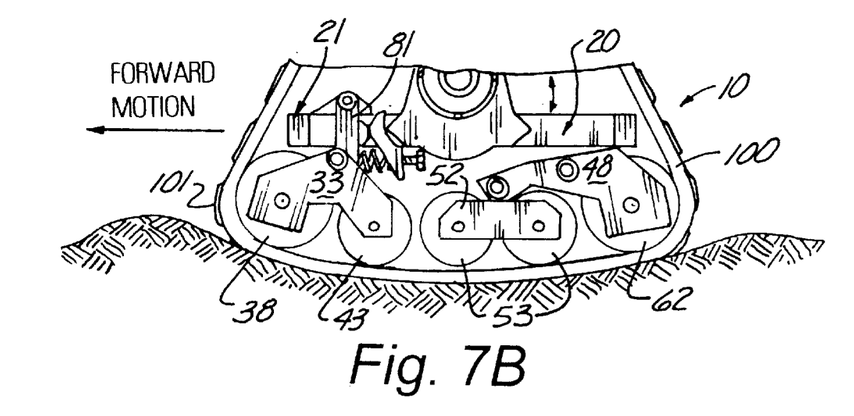
Figure 15:
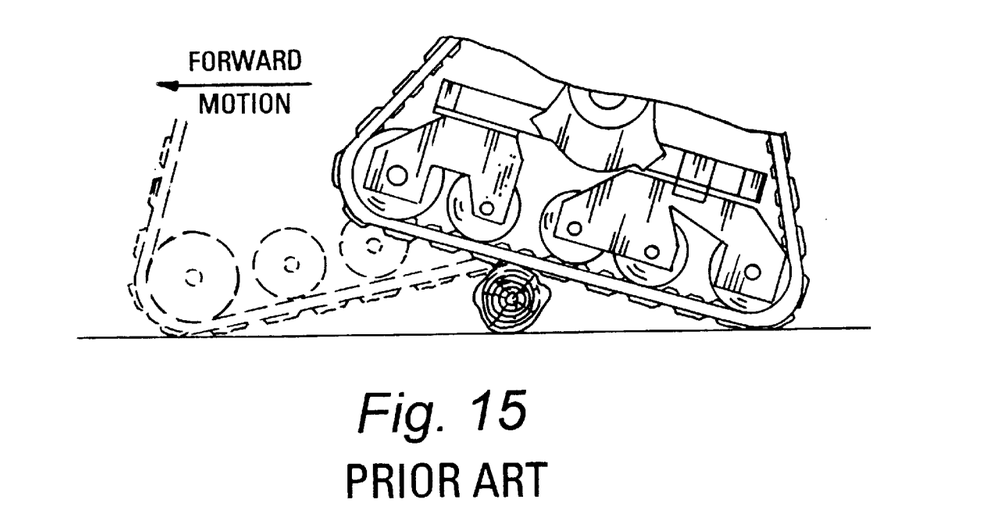
FIG. 15 is a schematic side view of a prior art track system in solid lines as it begins to pass over an obstruction and in dashed lines as it continues to pass over the obstruction.

The purpose of having the leading equalizers (31) and trailing equalizers (32) pivotably attached to the frame (20) is best illustrated in FIGS. 7, 7A, and 7B. As the vehicle (11, 12) moves over uneven terrain, the entire apparatus (10) is allowed to pivot about the first pivot axis (16). The leading equalizers (31) and trailing equalizers (32) are allowed to pivot about the second pivot axis (17) and third pivot axis (18) respectively, and the intermediate roller assemblies (51) is allowed to pivot about the fourth pivot axis (19). The pivoting ability of the equalizers (31, 32) and intermediate assemblies (51) allows more of the track (100) to remain in substantial contact with the ground surface at all times, thus improving vehicle traction. The pivoting action of the equalizers (31, 32) also allows the load to be distributed more equally between the individual idler rollers (38, 43, 53, 62) along the surface of the track thereby reducing the point load on each individual idler roller as the track (100) passes over an obstruction such as a rock. The operation of the instant track (10) shown in FIGS. 7, 7A, and 7B is in stark contrast to the prior art track (200) shown in FIG. 15 wherein the flat bottom stays but just tilts as it passes over obstruction (201) as it moves in the direction of the arrow from the solid line left position to the dashed line right position shown in FIG. 15.

In addition to the pivoting action of the equalizers (31, 32) to maintain the track (100) in more contact of with the ground surface and to distribute the load between the individual rollers, the leading equalizers (31) are also spring biased against the frame (20) to keep the tension on the track (100) within a predetermined range. It is desirable to keep the tension on the track within a predetermined range because excessive tension on the track may cause the track (100) to tear, alternatively excess slack in the track (100) may result in slipping of the track driving means (discussed below).

As illustrated in FIGS. 7 and 7B, as the vehicle (11, 12) passes over a rise, an obstruction or into a dip, the uneven terrain causes the track (100) to stretch as the pivoting equalizers (31, 32) force the track (100) to conform with the terrain. If the leading equalizers (31) were not spring biased so as to allow the equalizers (31) to recoil, thereby reducing the tension on the track (100), the track (100) may experience excessive tensile stress causing it to tear. The same result may occur if an obstruction (such as a rock) gets between the track (100) and the idler rollers (38, 43, 53, 62). Additionally, as illustrated in FIG. 7A, the track may also be forced to contract as the vehicle (11, 12) enters a ditch or hits an obstruction. In that situation, the equalizers (31) are allowed to swing forward so as to prevent excess slack in the track (100) which may result in the driving means slipping.

Figure 14:
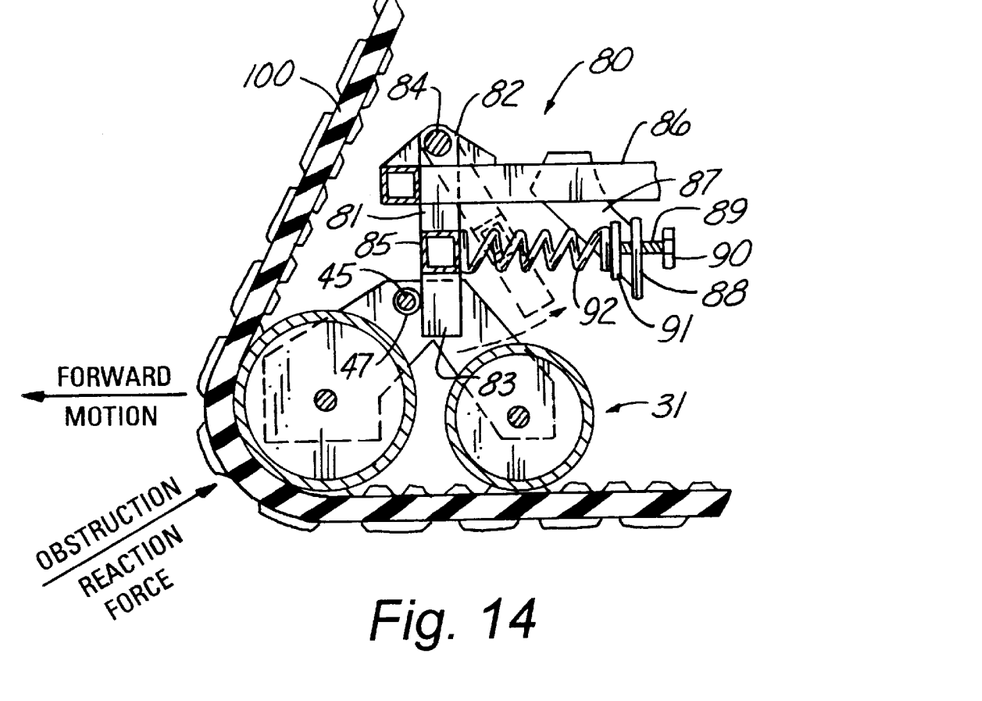
FIG. 14 is a section view taken along lines 14—14 of FIG. 13.

The components of the spring bias mechanism (80) is best illustrated in FIG. 14. in conjunction with FIG. 13. A pair of arms (81) having first ends (82) and second ends (83) are pivotably attached at said first ends (82) to the forward portion (21) of the frame (20) by a fifth pin (84). A horizontal member (85) is fixedly attached between said arms (81) intermediate said first ends (82) and said second ends (83). As discussed previously, near the second ends (83) of the arms (81) is attached a bushing (47) which receives a first pin (45) for pivotably mounting the leading equalizer (31). Rigidly attached at one end to a rearwardly projecting member (86) of the frame (20) is a pair of rearwardly sweeping brackets (87). At the other end of the rearwardly sweeping brackets (87) is fixed a face plate (88). The face plate (88) has a threaded hole near its midpoint for receiving a threaded rod (89). One end of the threaded rod has a knob (90) which can be used to turn the rod (89) clockwise or counterclockwise thereby causing the rod (89) to move inwardly or outwardly with respect to the face plate (88). The other end of the rod (89) abuts a plate (91) fixedly attached to a spring (92) spanning the distance between the face plate (88) and the horizontal member (85). The desired amount of tension on the track (100) can be achieved as described below.

The knob (90) may be turned clockwise thereby causing the threaded rod (89) to force the plate (91) toward the horizontal member (85). The forward movement of the plate (91) exerts a force on the spring (92) which in turn forces the arms (81) to rotate forwardly about the fifth pin (84) which in turn causes the leading equalizer (31) to move forwardly, increasing the tension on the track (100). Turning the knob (90) counterclockwise causes the rod (89) to move rearwardly with respect to the face plate (88) which in turn releases the force acting against the spring (92). The reduced force acting against the spring (92) allows the arms (81) to rotate rearwardly about the fifth pin (84) which in turn causes the leading equalizer (31) to move rearwardly reducing the tension on the track (100). It should be noted that each set of the leading equalizers (31) has its own spring bias mechanism (80) as best illustrated in FIG. 13.

The action of the spring bias mechanism (80) works as follows. When the flexible track (100) encounters an obstruction in the terrain, such as a rock, the reactionary force of the obstruction will cause the leading equalizers (31) to both pivot upward about the second pivot axis (17) and to recoil momentarily, thus causing the arms (81) to swing rearwardly. As the track (100) moves over the obstruction, the spring bias will force the arms (81) to swing forwardly, thus returning the track (100) to the desired tension. Similarly, as the vehicle (11, 12) moves over a small rise in the terrain, as illustrated in FIG. 7, the flexible track (100) will be forced to conform with the terrain by the pivoting action of the leading and trailing equalizers (31, 32) thus increasing the tension on the track (100). The increased tension on the track will impart a force on the leading equalizers (31) causing them to recoil rearwardly, which in turn will cause the arms (81) to swing rearwardly reducing the tension on the track. As the vehicle (11, 12) moves beyond the rise in the terrain, the spring bias will force the arms (81) to swing forward thereby causing the leading equalizer (31) to move forward keeping the desired tension on the track (100). Also, if a rock, branch or any other thing lodges between wheels (38) and/or (62), it could create enough force on the track (100) to break it. But, by providing the spring mechanism (80), the rock, branch, etc. will just pass through between the wheels (38) and/or (62) without damage to the track (100).

The driving means of the present invention (10), is comprised of an endless track (100) having on its outer surface an endless track pattern (101) (as partially seen in FIG. 1), and on its inner surface an endless series of transverse raised nubs (102). The track (100) is preferably constructed of a flexible yet durable material such as rubber. Motion of the track (100) is accomplished as follows.

Figure 5:
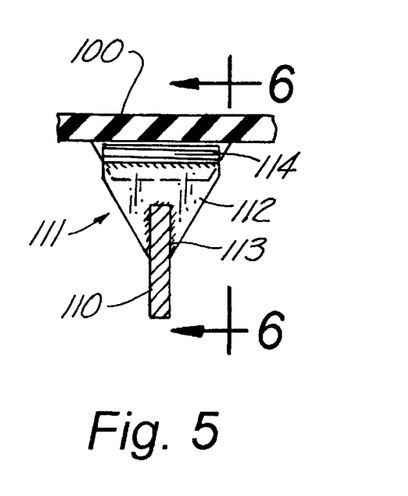
FIG. 5 is an enlarged cross-sectional view taken along line 5—5 of FIG. 2.
Figure 6:
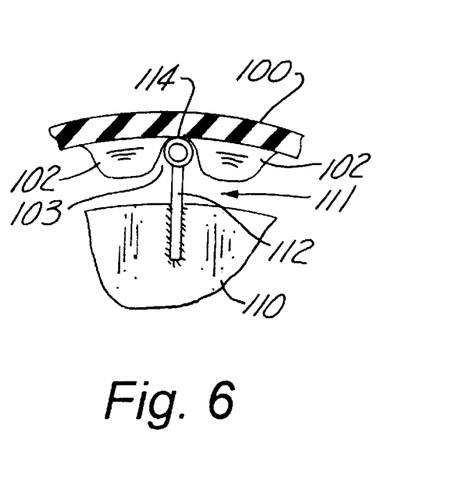
FIG. 6 is a view taken along line 6—6 of FIG. 5.

Referring to FIG. 2, a drive wheel (110) rotatably attached to the axle (13,14) by an adapter means, moves the track (100) about the periphery of the device (10) causing motion of the vehicle (11,12). The adapter means will be discussed later. The drive wheel (110) has a plurality of equally spaced, radially disposed drive paddles (111) about its circumference. FIG. 5 shows a rear view of a drive paddle (111) as seen along line 5—5 of FIG. 2 with the endless track (100) in transection. FIG. 6 is a side view of FIG. 5 as seen along line 6—6. As is shown in these two illustrations, each drive paddle (111) comprises a generally flat support plate (112) having a tapered lower region (114) which is attached in a permanent way, such as by welding, to the outer edge of the drive wheel (110). Each drive paddle (111) further comprises a generally cylindrical end portion (114) which is permanently fixed along one side of its long aspect to the radially distal end of the support plate (112). The cylindrical end portion (114) of each drive paddle (111) is of such a size and shape that it is easily received in the space (103) between two adjacent transverse nubs (102). The transverse nubs (102) are evenly spaced about the inside circumference of the track (100) in a way that allows continuous matching engagement of the drive paddles (111) with the spaces between the transverse nubs (102) as the drive wheel (110) is rotated and the track (100) is driven.

Figure 4:
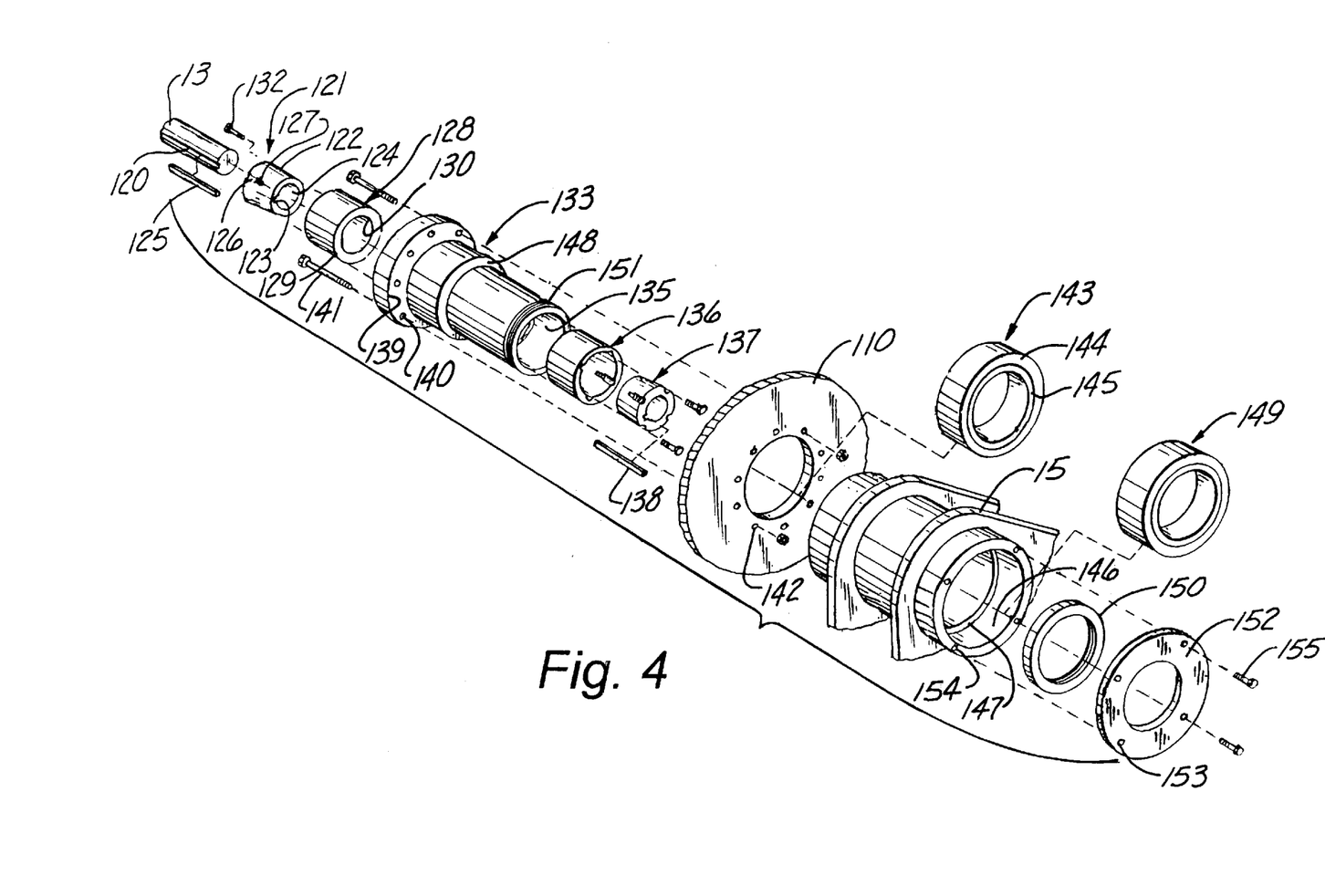
FIG. 4 is an exploded view of the primary frame on which the track suspension apparatus is mounted along with the drive wheel and all of the associated parts for connecting it to a grooved axle of an agricultural tractor.

It is well known in the art that vehicles which are in need of a tracked wheel apparatus may be of different types and manufacture, particularly with respect to the axles of such vehicles. Therefore, the present invention provides attachment means for a number of different axle types. For example, FIG. 4 provides an exploded view of a means for attachment of the present invention to a vehicle having a grooved axle (13). For purposes of orientation, the grooved axle (13) may be considered an extension of the vehicle to which the apparatus is attached.

The axle (13), having a groove (120), extends through the apertures of the components of FIG. 4 that are shown to be concentric about the longitudinal axis of the axle (13), and is attached in the following way. A first lock bushing (121), having a tapered outer surface (122) and a longitudinal groove (123) along its cylindrical inner surface (124), is provided in addition to an elongated first key (125) for purposes of engaging the axle (13) in a locking fashion. With the axle (13) extended through the first lock bushing (121), the first key (125) is inserted so as to be received simultaneously on one side by the groove (123) on the inner cylindrical surface (124) of the first lock bushing (121) and on the other side by the groove (120) of the axle (13). Thus engaged, the groove (120) of the axle (13) is aligned and locked with the groove (123) of the first lock bushing (121) and any rotation of the axle (13) about its longitudinal axis causes equal rotation of the first lock bushing (121) about the same axis.

The tapered outer surface (122) of the first lock bushing (121) is further provided with a plurality of generally elongated, semi-cylindrical indentations (126), each having a partially threaded inner surface (127). A first lock hub (128) having a cylindrical outer surface (129) and a tapered inner surface (130) is disposed to receive the outer tapered surface (122) of the first lock bushing (121). In order to accomplish such reception, the inner surface (130) of the first lock hub (128) further comprises a plurality of generally elongated, semi-cylindrical protrusions (131) (not visible in this view), each with a partially threaded inner surface (132) (also not visible in this view), which are of such number and arrangement as to match the generally elongated, semi-cylindrical indentations (126) of the tapered outer surface (122) of the first lock bushing (121). Thus, once engaged and properly aligned, the indentations (126) of the outer tapered surface (122) of the first lock bushing (121) and the protrusions (131) of the inner tapered surface (130) of the first locking hub (128) form a plurality of fully threaded bores (not seen directly in FIG. 4 due to being an exploded view). With a matching threaded bolt (132) threadedly engaged in each fully threaded bore, the first lock bushing (121) and the first lock hub (128) are secured together.

The first lock hub (128) is positioned within a spindle (133) having a first aperture (134) (not visible in this view) which has an inner diameter equal to the outer diameter of the first lock hub (128). In order to prevent rotation of the first lock hub (128) with respect to the spindle (134), these two elements are joined in a permanent way, such as that provided by welding.

The spindle (134) further provides a second aperture (135) for receiving a second lock hub (136). The second lock hub (136), in addition to a second lock bushing (137), second elongated key (138), and additional threaded bolts (139), all having identical functionality and form to, respectively, the first lock hub (121), first lock bushing (128), first elongated key (125), and threaded bolt (132), are symmetrically engaged in order to effect simultaneous rotation of the axle (13) and the spindle (133).

The spindle (133) further provides a flange (139) having a plurality of apertures (140) which are disposed to meet a drive wheel (110) having a matching plurality of apertures (115). The drive wheel (110) is shown in cutaway form for the sake of clarity. When the apertures (140) of the flange (139) are aligned with the apertures (115) of the drive wheel (110), an equally numbered plurality of threaded bolts (141) are extended simultaneously through both pluralities of apertures to meet an equal number of threaded nuts (142). With threaded engagement between the partially threaded bolts (141) and the threaded nuts (142), the flange (139) of the spindle (133) and the drive wheel (110) are secured together.

The spindle (133) is received by a first bearing (143) which has a stationary outer portion (144) and an inner portion (145) which is rotatable relative to the stationary outer portion (144). The stationary outer portion (144) of the first bearing (143) is received by a first race (not shown, but symmetric to a second race (146), shown and also described below) which is located on the inner surface of a spindle hub (15). As measured with respect to the longitudinal axis of the axle (13), the width of the first bearing (143) and the first race are the same such that the first bearing (143) is trapped in fitting engagement on one side by a raised portion (147) of the interior of the spindle hub (15) and on the other side by a raised portion (148) of the spindle (133).

A second bearing (149) having structure and functionality identical (except as described below) to the first bearing (143) is provided for purposes of receiving the spindle (133) in a way which is symmetric to the first bearing (143) with respect to the spindle hub (15). The second bearing (149) is positioned within a second race (146) and is held in trapped engagement on one side by the raised portion (147) of the spindle hub (15); however, on the other side, the second bearing (149) is secured in place by a threaded spindle nut (150) which meets a threaded end portion (151) of the spindle (133) in threaded engagement. Thus configured, relative motion of the spindle hub (15) and spindle (133) in either direction along the longitudinal axis of the axle (13) is prevented while rotation of the spindle (133) about the longitudinal axis within the spindle hub (15) is facilitated.

A hub cap (152) having an internal seal (not shown) and a plurality of apertures (153) is aligned with a matching plurality of threaded bores (154) which are disposed around the periphery of the spindle hub (15). With the immediately aforementioned components properly aligned, a plurality of threaded bolts (155) is extended through the apertures (153) of the hub cap (152) into the plurality of threaded bores (154) wherein they are received in threaded engagement. Thus engaged, and in conjunction with its internal seal (not shown), the hub cap (152) provides protection for the components of the assembly which lie within the spindle hub (15) against such elements as dirt, dust, and moisture.

The spindle hub (15) is held in a fixed position relative to the frame (20) through welding or other permanent means. The frame (20), among other functions, provides support for the remainder of the apparatus (10). Thus, once engaged as described above, a vehicle having a grooved axle (13), may provide rotation of the drive wheel (110) thereby causing the track (100) to rotate about the periphery of the apparatus (10) producing motion of the vehicle.

FIG. 9 illustrates a structure for attaching the present invention to a vehicle having an axle (14) with a flanged end (160). As is easily seen, this method of attachment is similar to that previously described for attachment to a vehicle having a grooved axle (13).

The flanged end (160) of the axle (14) provides a plurality of apertures (161) about its periphery. A matching plurality of apertures (140) is also provided about the periphery of the flange (139) of the spindle (133). The drive wheel (110) is provided with a plurality of apertures (115) which match the apertures (140) of the spindle flange (139) as well as the apertures (161) of the flanged end (160) of the axle (14). Once engaged, a plurality of threaded bolts (162) is extended through the triply aligned pluralities of apertures. A matching number of threaded nuts (163) meets the plurality of threaded bolts (162) in threaded engagement thereby securing together the flanged end (160) of the axle (14), the spindle (133), and the drive wheel (110). Thus, rotation of the axle about its longitudinal axis effects simultaneous rotation of the drive wheel (110).

The remaining elements of FIG. 9, namely a first bearing (143), a spindle hub (15), the frame (20), a second bearing (149), a threaded spindle nut (150), a hub cap (152), and a plurality of threaded bolts (155), are all identical in form, function, and engagement to those elements previously described for use in attaching the apparatus to a vehicle having a grooved axle as illustrated in FIG. 4.

Thus, once properly engaged, a vehicle having an axle (14) with a flanged end (160) may gain use of the present invention with equal effectiveness to that of a vehicle having a grooved axle (13).

Figures 10, 11, 12:
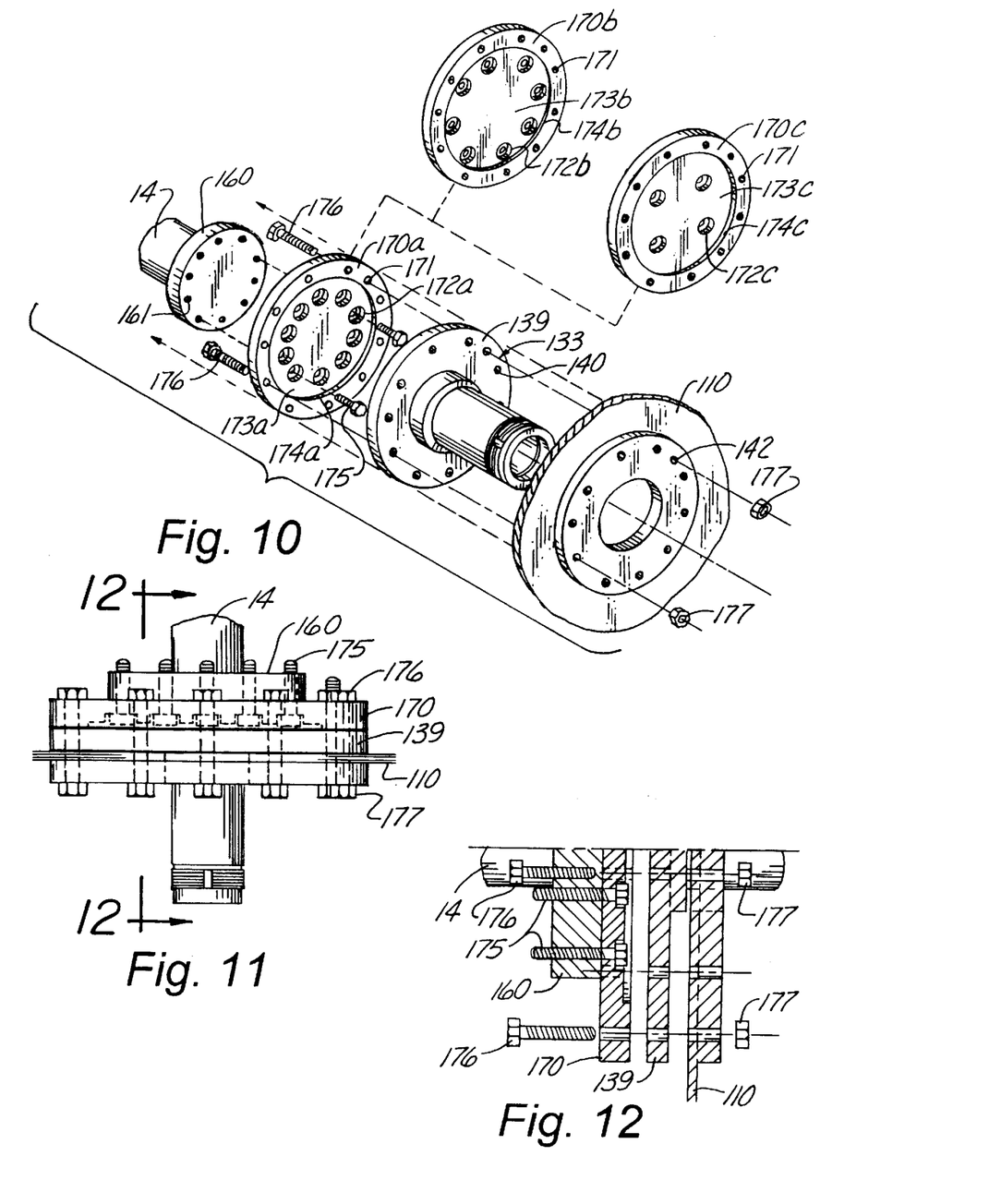
FIG. 10 is an exploded view showing adapter plates and drive wheel mounted to the hub of an agricultural combine.
FIG. 11 is a top plan view of the adapter plates and drive wheel of FIG. 10 assembled and mounted to the hub of an agricultural combine.
FIG. 12 is a section view taken along lines 12—12 of FIG. 11.

Referring now to FIGS. (10, 11 & 12) another preferred embodiment of the invention is shown. An axle (14) with a flanged end (160) is shown. The flanged end (160) of the axle provides a plurality of apertures (161) about its periphery. The problem is that this flanged end (160) and the pattern and size of the apertures (161) is different for most combines from one brand to another. Also, some larger horse-powered tractors have this type of flanged axle (14) and the pattern and size of the apertures (161) also varies from one brand of tractor to another. Therefore, there is a need for a way to universally attach the drive wheel (110) to the flanged axle (14), there being no solution for this problem in the prior art.

A plurality of interchangeable connector plates (170a, 170b, & 170c) are shown in FIG. 10 and the configuration of the connector plate is essentially controlled by the particular type of flanged end (hereinafter hub) (160) and the size and configuration of the apertures (161) therein. For example, certain John Deere tractors or combines may have one pattern while those for J. I. Case or other manufacturers may have a different configuration and size for apertures (161). Therefore, it is an aspect of this invention to use interchangeable plates (170a, 170b, or 170c) or any other number required to adapt to any particular manufacturer's hub (160). The connector plates (170a, 170b, or 170c) have an outer pattern of apertures (171) and an inner pattern of apertures (172a, 172b, 172c) within a recessed area (173a, 173b, 173c) defined by a shoulder (174a, 174b, 174c). The outer pattern of apertures (171) have an identical pattern as the apertures (142) of the drive wheel (110). The inner pattern of apertures (172a, 172b, 172c) are dictated by the particular manufacturer's hub (160). The different patterns are clearly shown by comparing connector plates (170a, 170b, & 170c). The recessed area (173a, 173b, 173c) of each connector plate (170a, 170b, 170c) defined by the shoulder (174a, 174b, & 174c) respectively provides a space to hold the head of connecting bolts (175) which are received into the inner pattern of apertures (172a, 172b, 172c) and are threaded into the openings (161) in the hub (160).

A spindle (133) is provided having a flange (139) with a plurality of apertures (140) disposed around its periphery and identical to the pattern of apertures (142) in the drive wheel (110) and also identical to the outer pattern of apertures (171) of the connector plate (170a, 170b, or 170c). A plurality of threaded bolts (176) is extended through the triply aligned pluralities of apertures. A matching number of threaded nuts (177) meets the plurality of threaded bolts (176) in threaded engagement thereby securing together the connector plate (170a, 170b, or 170c) the spindle (133), and the drive wheel (110). With the connector plate (170a, 170b, or 170c) being previously connected to the hub (160), the rotation of the axle (14) about its longitudinal axis effects simultaneous rotation of the drive wheel (110).

Consequently, the vehicle attached to hub (160) can be utilized, for example, on a combine during the harvest season and then after it is no longer needed, the track units (10) could be removed and placed on a tractor having a different hub pattern during other times of the season perhaps by merely changing to an appropriate connector plate such as (170b or 170c) or by connecting to a grooved axle (13) as previously disclosed.

Another major advantage is that one track system (10), with various connector plates, can be used on any one of many implements such as combines or tractors. This allows the dealer to stock perhaps only one pair of track units (10) and then when the customer orders these track units for a particular vehicle, the dealer could then just merely provide a pair of appropriate adaptor plates like (170a, 170b, or 170c), for example if the customer wishes to use the tracks on only one vehicle. If the customer wishes to later sell it, it would have a high market value because it would not only be marketable to persons with the same type of agricultural vehicle as its owner, but could be marketed to practically anyone owning large agricultural vehicles by merely buying an appropriate pair of connector plates. This is in contrast to the trend in the industry which dedicates the tracks to a particular type, size and brand of vehicle and is built custom-made for that tractor or combine or the like. These track units custom-made for a particular vehicle, therefore, do not have the versatility by a customer to switch from a tractor or a combine and do not have the market value associated with the present invention which can be used on practically any vehicle by merely making an appropriate pair of adaptor plates (170).

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooded parts together, whereas a screw employs a helical surface, in the environment of fastening wooden parts, a nail and a screw may be equivalent structures.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A track suspension apparatus for a vehicle of a type having a powered drive shaft for rotation about a drive axis, comprising:

a frame operably pivotably attached to said vehicle drive shaft;

a continuous flexible track;

a drive wheel adapted to be attached to a vehicle and operatively and rotatably attached about said drive axis to said frame for engaging and driving said continuous flexible track; and an undercarriage mounted to said frame, said undercarriage including at least two leading equalizers and two trailing equalizers, the leading and trailing equalizers being independently-pivotable on said frame, each leading equalizer having leading and trailing front idler rollers rotatably attached thereto in fixed relative positions and each trailing equalizer having intermediate rollers and trailing rear idler rollers rotatably attached thereto, the rear idler rollers being rotatable attached to a trailing arm and the intermediate rollers being rotatable attached to an intermediate-roller mounting plate which is pivotably mounted with respect to the trailing arm said idler rollers being in engagement with said track.

2. The apparatus of claim 1 wherein said undercarriage includes a spring biasing mechanism operably attached to the frame for at least one of said leading and trailing equalizers to maintain tension on said track within a predetermined range.

3. The apparatus of claim 2 wherein said spring biasing mechanism includes an adjustment means for adjusting the tension on said track.

4. A track suspension apparatus for a vehicle of a type having a powered drive shaft for rotation about a first axis, comprising:

a frame operably pivotably attached about the first axis to said vehicle drive shaft;

a continuous flexible track;

a drive wheel adapted to be attached to a vehicle and operatively and rotatably attached about said first axis to said frame for engaging and driving said continuous flexible track; and a leading equalizer assembly pivotably attached to said frame about a second axis;

a trailing equalizer assembly pivotably attached to said frame about a third axis, the leading and trailing equalizer assemblies being independent of each other in their pivotable mounting to the frame;

front idler rollers operably and rotatably attached to each end of each of the leading [and trailing] equalizer assembly in fixed relative positions, said idler rollers being in engagement with said track;

a rear idler roller operatively and rotatable attached to the trailing end of the trailing equalizer assembly; and an idler assembly pivotably attached to the leading end of the trailing equalizer assembly about a fourth axis and having first and second idler-assembly idler rollers operably rotatable attached thereto.

5. The track suspension apparatus of claim 4 wherein the first, second, third and fourth axes and the axes of rotation of the rollers are all parallel with respect to each other.

\* \* \* \* \*